US012356175B2

(12) United States Patent
Millias et al.

(10) Patent No.: US 12,356,175 B2
(45) Date of Patent: Jul. 8, 2025

(54) METHOD AND DEVICE FOR PROCESSING HRTF FILTERS

(71) Applicant: BACCH LABORATORIES, INC., Gainesville, FL (US)

(72) Inventors: Nicholas Vasili Millias, Reno, NV (US); Edgar Choueiri, Princeton, NJ (US)

(73) Assignee: BACCH LABORATORIES, INC., Gainesville, FL (US)

(*) Notice: Subject to any disclaimer, the term of this patent is extended or adjusted under 35 U.S.C. 154(b) by 259 days.

(21) Appl. No.: 18/195,768

(22) Filed: May 10, 2023

(65) Prior Publication Data

US 2023/0370800 A1 Nov. 16, 2023

Related U.S. Application Data

(60) Provisional application No. 63/340,141, filed on May 10, 2022.

(51) Int. Cl.
*H04S 7/00* (2006.01)

(52) U.S. Cl.
CPC ............ *H04S 7/30* (2013.01); *H04S 2420/01* (2013.01)

(58) Field of Classification Search
CPC ........ H04S 7/30; H04S 7/307; H04S 2400/01; H04S 2400/11; H04S 2420/01
(Continued)

(56) References Cited

U.S. PATENT DOCUMENTS

2017/0245082 A1 8/2017 Boland
2017/0325045 A1 11/2017 Baek et al.
(Continued)

FOREIGN PATENT DOCUMENTS

KR 10-2019-0075807 A 7/2019

OTHER PUBLICATIONS

Algazi, V. R. et al. "The Cipic Hrtf Database." IEEE Workshop on Applications of Signal Processing to Audio and Acoustics, pp. 99-102, (Year: 2001).

(Continued)

*Primary Examiner* — Paul Kim
(74) *Attorney, Agent, or Firm* — SALIWANCHIK, LLOYD & EISENSCHENK

(57) ABSTRACT

Embodiments of the invention relate to a method and device for adaptive Head Related Transfer Function (HRTF) individualization for binaural rendering through headphones, earphones or crosstalk-cancelled speakers. The Adaptive HRTF individualizer (AHI) can simplify the complicated problem of custom tailoring an HRTF to a user via a GUI (graphical user interface), and can incorporate a single controller (e.g. a slider) that controls the selection of filters that allow the listener to virtualize sound sources at desired locations through any binaural rendering system. The slider allows cycling through processed HRTFs that are a composite of deconstructed measured filters with reconstructed cues such as interaural time difference (ITD) and interaural level difference (ILD). The deconstructed filters are analyzed and pre-processed enabling a smooth interpolation of the filters in the time domain prior to the addition or reconstruction of cues into the filter itself. Expanding this procedure for a single location into multiple locations enables a customized and accurate listening experience for multichannel content virtualized through any binaural rendering system. This can be done for a multitude of speaker locations to customize and render any surround sound content.

20 Claims, 3 Drawing Sheets

(58) Field of Classification Search
USPC .......................................................... 381/303
See application file for complete search history.

(56) References Cited

U.S. PATENT DOCUMENTS

2020/0021939 A1 1/2020 Oland et al.
2020/0186951 A1 6/2020 Audfray et al.
2022/0030373 A1 * 1/2022 Mehta ....................... H04S 7/30

OTHER PUBLICATIONS

Warusfel, Olivier "Listen HRTF Database", Jun. 9, 2002, URL: http://recherche.ircam.fr/equipes/salles/listen/, Accessed: Jun. 6, 2023.

* cited by examiner

METHOD AND DEVICE FOR PROCESSING HRTF FILTERS

CROSS-REFERENCE TO A RELATED APPLICATION

This application claims the benefit of U.S. Provisional Application Ser. No. 63/340,141, filed May 10, 2022, which are incorporated herein by reference in its entirety.

FIELD OF THE INVENTION

Embodiments of the invention relate to a method and device for adaptive Head Related Transfer Function (HRTF) individualization.

BACKGROUND OF THE INVENTION

Spatially accurate binaural virtualization of sound requires delivering to the listener audio that has been processed to contain the expected binaural cues that allow localizing sound sources at intended locations. Such cues, which include the ITD (interaural time difference), ILD (interaural level difference) and spectral cues, which are represented by the head-related transfer function (HRTF), are highly individualized as they significantly vary between individuals. Any mismatch between the HRTF used to process the audio and the actual HRTF of the individual listener can lead to errors in localization and degradation in the spatial realism of the binaural reproduction. The aim of HRTF individualization is to reduce this mismatch. Standard methods for obtaining individualized HRTFs include acoustic measurements of the individual's HRTF in an anechoic or semi-anechoic environment, and accurate numerical solution of the Helmholtz equation over a grid covering a representation of the individual's head. Such HRTF individualization methods have the disadvantage of being time-consuming, costly (as they require special equipment and acoustic environments or CPU and RAM intensive numerical solvers) and often impractical, as they require acoustical or morphological measurements involving the actual individual. The present invention allows individualizing an HRTF (or the subset of it required to virtualize a subset of spatial locations) without the above mentioned disadvantages by allowing the individual listener to calibrate the binaural rendering system by using a single controller (e.g. a slider in graphical user interface) to cycle through a composite and generic HRTF, constructed according to a prescription defined by the invented method, and selecting the individual filter(s) that best virtualize the sound at the intended location(s).

BRIEF SUMMARY

Embodiments of the invention relate to a method and/or device for adaptive Head Related Transfer Function (HRTF) individualization. The Adaptive HRTF Individualizer (AHI) allows tailoring (individualizing) an HRTF for a listener through a calibration process that relies on the use of a single controller (e.g. a slider in a graphical user interface) that allows cycling through a specially pre-processed composite HRTF and selecting and storing the filter that best virtualize sound at desired spatial locations. The selected filters are then used in any standard binaural rendering system (e.g. headphones, earphones, crosstalk-canceled speakers) to yield spatially accurate sound virtualization (e.g. the virtualization of the speakers of a surround sound system). The composite HRTF is constructed from an appropriately selected set of measured, calculated or synthesized HRTFs, which are deconstructed and processed in such a way as to retain a wide range of spectral cues, and enable smooth interpolation of the filters in the time domain prior to the judicious addition of interaural time difference (ITD) and interaural level difference (ILD). Expanding this procedure for a single location into multiple locations enables a customized and accurate listening experience for multichannel content virtualized through headphones. This can be done for a multitude of speaker locations to customize and render any surround sound content.

DETAILED DISCLOSURE

Figure 1:
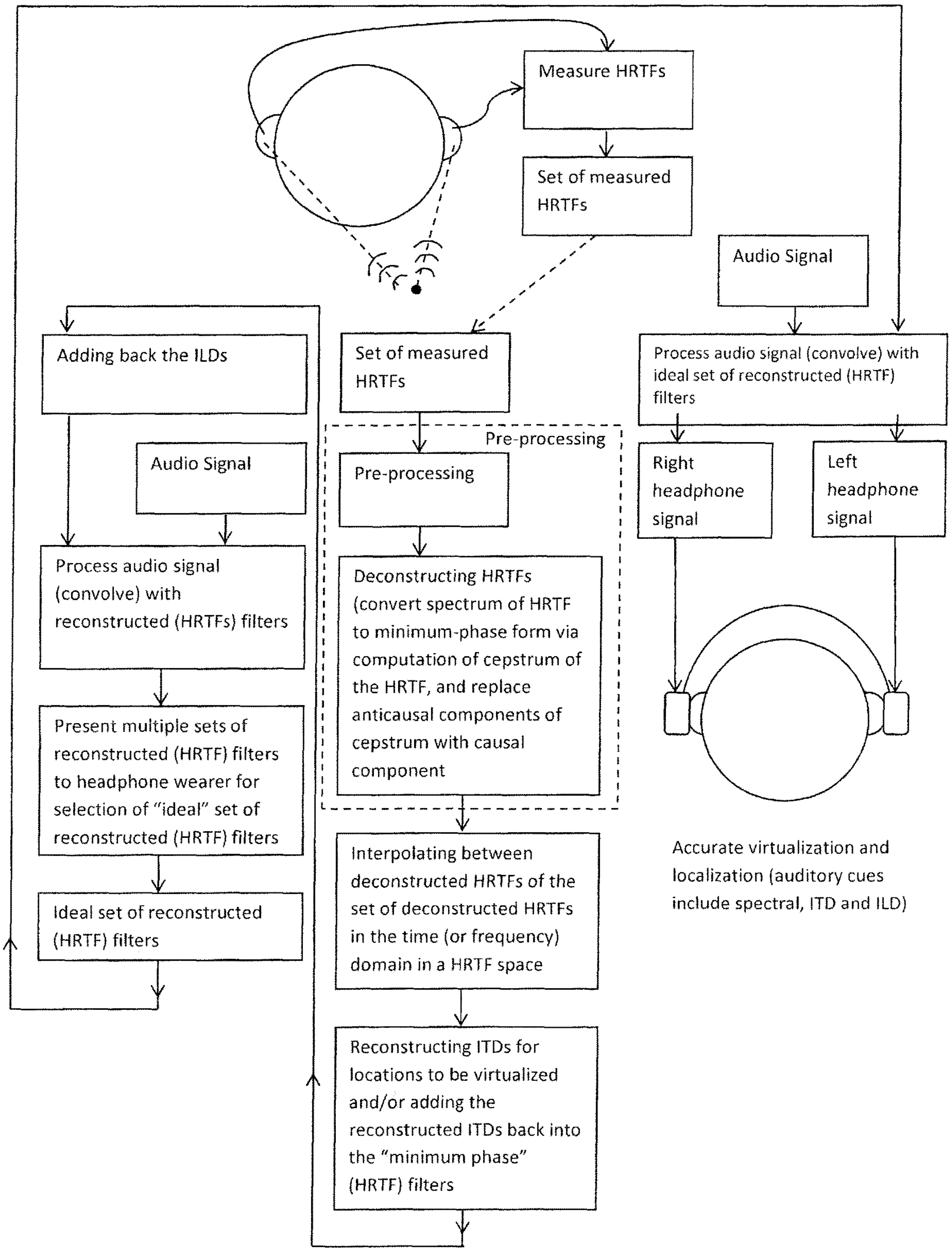
FIG. 1 shows a flow diagram for a specific embodiment of the subject invention.

The processing in embodiments of the subject adaptive HRTF individualizer (AHI) can be constructed starting with measured, calculated, or synthesized HRTFs, from here on called the "original HRTFs", that are pre-processed, and then further modified. The HRTFs used can be from a variety of sources including public databases such as: CIPIC HRTF Database (https://www.ece.ucdavis.edu/cipic/spatial-sound/hrtf-data/), IRCAM Listen HRTF Database (http://recherche.ircam.fr/equipes/salles/listen/), a private collection of HRTF sets, calculated HRTFs and/or synthesized HRTFs.

Procedures for Measuring, calculating or synthesizing HRTFs are known in the art and additional measures may arise, HRTFs resulting from which can be used with the subject invention.

The HRTF datasets, independent of their source, can be processed in accordance with the subject AHI, as described herein.

Preferably, pre-processing can be performed on the HRTFs, depending on the collection method used to generate the HRTFs. Preferably, all filters used as the basis to construct parameterized HRTFs for use in embodiments of the AHI are processed for consistency, and specific ILD and ITD cues inherent within measured HRTFs are preferably removed while retaining a wide range of spectral cues. This enables a smooth interpolation procedure over portions of, or the entirety of, the HRTF datasets and the ability to reconstruct synthesized cues in a controlled manner.

One or more of the following individual steps can be utilized in pre-processing the original HRTF datasets, typically in the time domain:

1. Input Validation: Select X diverse measured, calculated, or synthesized HRTF filters from X people that cover the range of HRTF filters for a given subset of a population. The number of people, X, can be any number greater than 1, and can be in the range of 2-4, 5-10, 10-15, 15-20, or greater than 20, and the population can be all people or a subgroup of people such as men, women, Chinese, Caucasians, Hispanic, a particular race, a specific geographic region of origin, or any other characteristic or group of characteristics. The set of HRTF filters can be for use with 5, 7, 20, or other number of surround sound locations, which can be spaced on a sphere such that the distance is fixed and there is no ILD manipulation. Prior to any processing, the filters are first checked for validity. The validity check can involve checking for any anomalies in the HRTF filter measuring equipment (such as inconsistencies of microphone placement), time shifts in the HRTF filters, noise in the HRTF filters, pre-ringing, or any other anomalies. This can be done manually looking over each filter in both time and frequency domain or done using an algorithmic approach implemented via hardware and/or software to detect anomalies.

2. EQ Compensation: Depending on the source of filters, a compensation equalization can be applied to balance out any inconsistencies (e.g., reduce spectral effects of HRTF filters), typically in low frequency response, or for example, to compensate for microphone (e.g., flatten) response of the microphone used measure or capture the HRTFs, such as flattening peaks and dips in the frequency domain. This includes well-known standard techniques for binaural equalization such as diffuse-field equalization.
3. Normalization: The gain is normalized to ensure the levels from all locations across HRTF filter datasets are consistent, i.e., the same. This normalization can remove issues with filters being collected with different microphone gains and sensitivities, as well as variations in the distances that the HRTFs were collected at.
4. Length Adjustment: Preferably, all filters are cut to a common length. This length, or number of samples, can be determined at any point in the processing chain and is typically dependent on the target binaural rendering system. This length value is typically a power of 2 (e.g., 256 samples) to ensure optimization on hardware. In a specific embodiment, 256 samples are provided in the HRTF filter, at a sampling rate of 48,000, 96,000, or 192,000 samples per second, such that the samples are impulses that are 256/48,000 second, etc.

4.5. There are three types of HRTF filters, (1) anechoic, obtained from measurements in environments where sound reflections are effectively eliminated (2) semi-anechoic, where early reflections are reduced, e.g., via foam and/or a large room, and (3) windowed, where the corresponding impulse responses have been windowed to eliminate or reduce the amount of reflected sound. Specific embodiments of the invention utilize one of these three types.

5. Minimum-Phase Conversion: The spectrum of the filter is converted to a minimum-phase form by computation of the cepstrum and replacing the anticausal with causal components, a cepstrum is the result of transforming a signal from the time domain to the frequency domain and computing the logarithm of the spectral amplitude. Converting the HRTF filter to minimum-phase removes ITD (causal), where at high frequency phase dominates and at low frequency delay dominates. This reflects non-minimum-phase zeros inside the unit circle preserving spectral magnitude. The conversion to minimum-phase moves all the poles and zeros of the rational transfer function in the Z-transform domain inside the unit circle. While such conversion removes the ITD cues it maintains the inherent spectral cues.
6. Output Validation/Analysis: Preferably, validation/analysis of the output, for example after any one or more of the previously described steps can be used to ensure that all filters have minimum-phase representations and are consistent across all datasets. This can ensure the processing that follows will be consistent, and all data will be valid.

In a specific embodiment of the subject AHI, the pre-processing can include all 6 of the above-described steps. In a specific embodiment, the pre-processing is accomplished in the time domain.

Synthetization and Reconstruction of Cues

After pre-processing, which can optionally be performed at measurement of the original HRTF filters, synthetization and reconstruction of cues can then be accomplished. In a specific embodiment, once all filters are deconstructed and processed into a common baseline filter, an additional processing procedure interpolates through a HRTF space and introduces interaural time difference (ITD) and interaural level difference (ILD) in a linear fashion to enable smooth parameter mapping to an appropriate interface, such as a single slider. The ITD and ILD can be introduced using established equations and models that can optionally be optimized or corrected, e.g., based on the current state of research. As the localization cues in HRTF differ widely across the human population and can be constrained to a narrower space to accommodate a specific market.

An embodiment of the processing procedure can be implemented in accordance with one or more of the following:

1. Filter Order: The HRTF filters can be optionally analyzed to order them prior to interpolation to meet certain criteria. These criteria can change. The order of the filters can be determined by analyzing the notches in high frequencies and the filters then ordered in increasing fundamental as well as single or double notched filters. The order can also be determined or adjusted more subjectively through auditioning to minimize abrupt transitions and other audible artifacts.
2. Interpolation (Time Domain): Minimum-phase HRTF filters are inherently time aligned (if not, then output validation can do so) so the time domain interpolation between filters can be done using a linear interpolation method over N Steps. N can be increased to create smoother transitions or reduced if constrained on resources. The filter interpolation can also be done in the frequency or time domain.
3. ITD Synthetization: ITDs can be introduced to virtualize a set of sound locations (e.g. a standard surround sound speaker configuration). In the azimuthal plane the spherical head model can be used to determine the time delay between left and right ears for a given head radius. The radius head is varied to accommodate a range of head sizes to calculate their respective ITDs. A range of head sizes can be chosen to accommodate a specific target market or population. Additionally, multiple models or methods can be used to introduce the time delay. Additionally, or alternatively, the ITD can be extracted from real data and used in this step. Multiple sets of ITD, e.g., 4, can be synthesized for each HRTF filter.
4. ITD implementation: ITD can be determined using various models, the simplest being the Spherical head Model by Woodsworth. Other variants of this model can also be used. The Interaural Time Difference (ITD) provides the major cue for azimuth localization and is a core part of any HRTF model. If the head is approximated by a sphere of radius a, the ITD for an infinitely distant source can be computed by a simple formula due to Woodworth [4]:

$$ITD = a/c(\theta + \sin\theta) \quad (1)$$

wherein θ is the azimuth angle and c is the speed of light.

Figure 2:
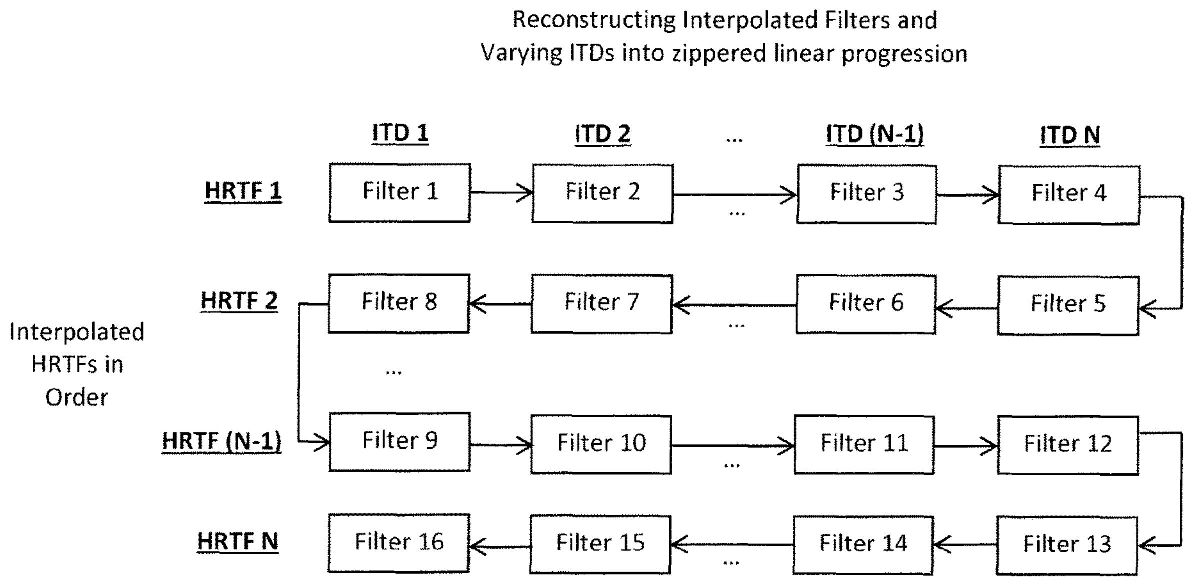
FIG. 2 shows a schematic for reconstructing interpolated filters and varying ITDs into zippered linear progression.
Figure 3:
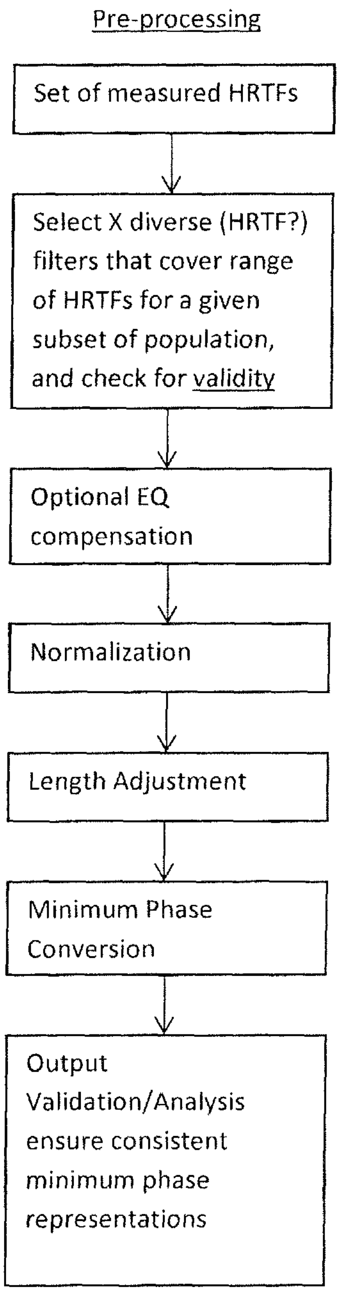
FIG. 3 shows various pre-processing actions, one or more of which can be implemented with various embodiments of the subject invention.

The ITD can then be added back into the minimum-phase HRTF filters. This can be done by time shifting the original HRTF filters and saving them in memory, or by calculating the ITD and shifting on the fly in processing. For each interpolated HRTF filter there are an additional M unique HRTF filters that are made by adding the range of ITDs into the HRTF filter in a zippering fashion shown in FIG. 2.

A more detailed description of these features are as follows:

Filter Order

Prior to the filters being interpolated and reconstructed into a final dataset per localized source, they can be analyzed and ordered. This is done to ensure smooth transition through the interpolation process that covers the entire "space" of HRTF for the intended application. This ordering process can be done a variety of ways, such as via one or more of the following:

1. Peak and Dip analysis
2. Subjective analysis or auditioning aiming to decrease noise, sharp transitions, clicks, coloration or other audible artifacts.

Time Domain Interpolation

The number of steps between point A and B in the set of reconstructed filters can vary depending on the datasets, the target number of filters, and the target smoothness of filter transitions.

In an embodiment, the filters are aligned in the time domain, through a process of determining the "delay" in a filter, such as the time adjustment described in minimum-phase conversion and/or output validation. This delay is used to calculate the start of an impulse via standard thresholding and averaging methods.

In an embodiment, the interpolation is a linear weighted interpolation over a number of steps, N.

ITD Reconstruction

Additional ITD models can be used to generate ITDs for point sources for any desired location, based on the azimuth and elevation of the point source to be virtualized.

Once ITDs are calculated for the location in question for a range of head sizes (this range can vary depending upon the target market sector or population), the ITDs are reconstructed and applied individually to each unique HRTF within the interpolated dataset. This can be done in a manner that allows for a smooth transition of ITDs before moving to the next interpolated filter.

Individualization

The reconstructed filters in their respective order for each location can be cycled through by the user while listening to any test signal processed through the filters with the goal of virtualizing the sound source at a desired location (e.g. the location of a certain speaker in a virtual 5.1 surround system). When the desired location is virtualized accurately or acceptably the selected filter is stored. The process can be repeated for another desired location of virtualized sound, which may correspond to a different selected filter. The subset of such selected and stored filters represents the subset of filters to be loaded in a binaural rendering/playback system (e.g. headphones or speakers with crosstalk cancellation), and used to process (e.g. through convolution) the audio to enable the listener to perceive sound sources at the intended spatial locations.

Embodiments

Embodiment 1. A method for head related transfer function (HRTF) individualization, comprising:

obtaining a set of N HRTF filters in the frequency or time domain, wherein the N HRTF filters of the set of N HRTF filters are measured, calculated, or synthesized HRTF filters;

converting each HRTF filter of the set of N HRTF filters to a minimum-phase form to produce a set of N minimum-phase HRTF filters in the time domain;

interpolating between two minimum-phase HRTF filters of the set of N minimum-phase HRTF filters in the time domain to produce an interpolated HRTF filter;

introducing L interaural time differences (ITDs) for L locations of sound sources to be virtualized, wherein L is an integer greater than or equal to 1; and adding the L ITDs back into the N minimum-phase HRTF filters of the set of N minimum-phase HRTF filters to produce a set of N reconstructed HRTF filters.

Embodiment 2. The method according to embodiment 1, wherein the HRTF filters of the set of N HRTF filters are measured HRTF filters.

Embodiment 3. The method according to any preceding embodiments, wherein each measured HRTF filter of the set of N measured HRTF filters is valid.

Embodiment 4. The method according to any preceding embodiments, wherein converting each HRTF filter of the set of HRTF filters to a minimum-phase form is accomplished via computation of a cepstrum (spectrum) of the HRTF filter in the frequency domain and replacing anticausal components of the cepstrum with casual components.

Embodiment 5. The method according to embodiment 4, wherein replacing anti causal components of the cepstrum with causal components reflects non-minimum phase zeros inside a unit circle preserving spectral magnitude.

Embodiment 6. The method according to any preceding embodiments, wherein prior to interpolating, ordering the N minimum-phase HRTF filters of the set of N minimum-phase HRTF filters to create an ordered set of N minimum-phase HRTF filters, wherein interpolating comprises interpolating between two adjacent minimum-phase HRTF filters of the ordered set of N minimum-phase HRTF filters, wherein the two minimum-phase HRTF filters interpolated between are minimum-phase HRTF filter 1 and minimum-phase HRTF filter 2, of the N minimum-phase HRFT filters 1, 2, . . . , N−1, N.

Embodiment 7. The method according to embodiment 6, where N is greater than 2, further comprising:

interpolating between minimum-phase filters 2 and 3, . . . , N−1 and N to produce N−2 additional interpolated HRTF filters, so as to produce a set of N−1 interpolated HRTF filters.

Embodiment 8. The method according to embodiment 7, further comprising:

interpolating between minimum-phase filters N and 1 to produce a further additional interpolated HRTF filter, so as to produce a set of N interpolated HRTF filters.

Embodiment 9. The method according to any preceding embodiments, further comprising:

repeating the steps of obtaining, converting, interpolating, introducing, and adding with respect to at least one additional set of N HRTF filters in the frequency or time domain to produce at least one additional set of N reconstructed HRTF filters.

Embodiment 10. The method according to embodiment 9, further comprising:

processing an audio signal with the set of N reconstructed HRTF filters and the at least one additional set of N reconstructed HRTF filters to produce a processed audio signal and at least one additional processed audio signal; and presenting a user with the processed audio signal and the at least one additional processed audio signal allowing the user to select an ideal set of N reconstructed HRTF filters.

Embodiment 11. A device for head related transfer function (HRTF) individualization, comprising:

a processor, wherein the processor is configured to:

obtain a set of N HRTF filters in the frequency or time domain, wherein the N HRTF filters of the set of N HRTF filters are measured, calculated, or synthesized HRTF filters;

convert each HRTF filter of the set of N HRTF filters to a minimum-phase form to produce a set of N minimum-phase HRTF filters in the time domain;

interpole between two minimum-phase HRTF filters of the set of N minimum-phase HRTF filters in the time domain to produce an interpolated HRTF filter;

introduce L interaural time differences (ITDs) for L locations of sound sources to be virtualized, wherein L is an integer greater than or equal to 1; and add the L ITDs back into the N minimum-phase HRTF filters of the set of N minimum-phase HRTF filters to produce a set of N reconstructed HRTF filters.

Embodiment 12. The device according to embodiment 11, wherein the HRTF filters of the set of N HRTF filters are measured HRTF filters.

Embodiment 13. The device according to embodiment 12, wherein each measured HRTF filter of the set of N measured HRTF filters is valid.

Embodiment 14. The device according to any of preceding embodiments 11-13, wherein converting each HRTF filter of the set of HRTF filters to a minimum-phase form is accomplished via computation of a cepstrum (spectrum) of the HRTF filter in the frequency domain and replacing anticausal components of the cepstrum with casual components.

Embodiment 15. The device according to embodiment 14, wherein replacing anti causal components of the cepstrum with causal components reflects non-minimum phase zeros inside a unit circle preserving spectral magnitude.

Embodiment 16. The device according to any of preceding embodiments 11-15, wherein prior to interpolating, ordering the N minimum-phase HRTF filters of the set of N minimum-phase HRTF filters to create an ordered set of N minimum-phase HRTF filters, wherein interpolating comprises interpolating between two adjacent minimum-phase HRTF filters of the ordered set of N minimum-phase HRTF filters, wherein the two minimum-phase HRTF filters interpolated between are minimum-phase HRTF filter 1 and minimum-phase HRTF filter 2, of the N minimum-phase HRFT filters 1, 2, . . . , N−1, N.

Embodiment 17. The device according to embodiment 16, where N is greater than 2, the processor is configured to:

interpolate between minimum-phase filters 2 and 3, . . . , N−1 and N to produce N−2 additional interpolated HRTF filters, so as to produce a set of N−1 interpolated HRTF filters.

Embodiment 18. The device according to embodiment 17, wherein the processor is configured to:

interpolate between minimum-phase filters N and 1 to produce a further additional interpolated HRTF filter, so as to produce a set of N interpolated HRTF filters.

Embodiment 19. The device according to any of any preceding embodiments 11-18, wherein the processor is configured to:

repeat obtaining, converting, interpolating, introducing, and adding with respect to at least one additional set of N HRTF filters in the frequency or time domain to produce at least one additional set of N reconstructed HRTF filters;

process an audio signal with the set of N reconstructed HRTF filters and the at least one additional set of N reconstructed HRTF filters to produce a processed audio signal and a processed audio signal and the at least one additional processed audio signal; and present a user with the processed audio signal and the at least one additional processed audio signal allowing the user to select an ideal set of N reconstructed HRTF filters.

Embodiment 20. One or more non-transitory computer-readable media having computer-readable instructions embodied thereon for performing a method for head related transfer function (HRTF) individualization, wherein the method comprises:

providing a processor, wherein the processor is configured to:

obtain a set of N HRTF filters in the frequency or time domain, wherein the N HRTF filters of the set of N HRTF filters are measured, calculated, or synthesized HRTF filters;

convert each HRTF filter of the set of N HRTF filters to a minimum-phase form to produce a set of N minimum-phase HRTF filters in the time domain;

interpolate between two minimum-phase HRTF filters of the set of N minimum-phase HRTF filters in the time domain to produce an interpolated HRTF filter;

introduce L interaural time differences (ITDs) for L locations of sound sources to be virtualized, wherein L is an integer greater than or equal to 1; and add the L ITDs back into the N minimum-phase HRTF filters of the set of N minimum-phase HRTF filters to produce a set of N reconstructed HRTF filters;

obtaining a set of N HRTF filters in the frequency or time domain, wherein the N HRTF filters of the set of N HRTF filters are measured, calculated, or synthesized HRTF filters;

converting each HRTF filter of the set of N HRTF filters to a minimum-phase form to produce a set of N minimum-phase HRTF filters in the time domain;

interpolating between two minimum-phase HRTF filters of the set of N minimum-phase HRTF filters in the time domain to produce an interpolated HRTF filter;

introducing L interaural time differences (ITDs) for L locations of sound sources to be virtualized, wherein L is an integer greater than or equal to 1; and adding the L ITDs back into the N minimum-phase HRTF filters of the set of N minimum-phase HRTF filters to produce a set of N reconstructed HRTF filters, wherein obtaining, converting, interpolating, introducing, and adding are accomplished via the processor.

Embodiment 21. A method of processing a set of N “original” HRTF filters, comprising:

obtaining a set of N measured, calculated or synthesized HRTF filters in the frequency or time domain (HRIR);

converting each HRTF filter of the set of N HRTF filters to a minimum-phase form to produce a set of N minimum-phase HRTF filters in the time domain interpolating between two minimum-phase HRTF filters of the set of N minimum-phase HRTF filters in the time domain to produce an interpolated HRTF filter.

introducing interaural time differences ITDs for L locations of sound sources to be virtualized, wherein L is an integer greater than or equal to 1;

adding the L ITDs back into the N minimum-phase HRTF filters.

Embodiment 22. The method according to embodiment 21, wherein the set of N HRTF filters is a set of N measured HRTF filters.

Embodiment 23. The method according to embodiment 22, wherein each measured HRTF filter of the set of N measured HRTF filters is valid.

Embodiment 24. The method according to any of embodiments 21-23, wherein converting each HRTF filter to a minimum-phase form is accomplished via computation of a cepstrum (spectrum) of the HRTF in the frequency domain and replacing anticausal components of the cepstrum with casual components.

Embodiment 25. The method according to embodiment 24, wherein replacing anti causal components of the cepstrum with causal components reflects non-minimum phase zeros inside a unit circle preserving spectral magnitude.

Embodiment 26. The method according to embodiment 21, wherein prior to interpolating, ordering the N minimum-phase HRTF filters of the set of N minimum-phase HRTF filters to create an ordered set of N minimum-phase HRTF filters, wherein interpolating comprises interpolating between two adjacent minimum-phase HRTF filters of the ordered set of N minimum-phase HRTF filters, wherein the two minimum-phase HRTF filters interpolated between are minimum-phase HRTF filter 1 and minimum-phase HRTF filter 2, of the N minimum-phase HRFT filters 1, 2, . . . , N−1, N.

Embodiment 27. The method according to embodiment 26, where N is greater than 2, further comprising:

interpolating between minimum-phase filters 2 and 3, . . . , N−1 and N to produce N−2 additional interpolated HRTF filters, so as to produce a set of N−1 interpolated HRTF filters.

Embodiment 28. The method according to embodiment 27, further comprising:

interpolating between minimum-phase filters N and 1 to produce a further additional interpolated HRTF filter, so as to produce a set of N interpolated HRTF filters.

Aspects of the invention, such as obtaining the original HRTFs, processing such HRTFs, filtering audio signals through the processed HRTFs, and rendering the resulting audio through headphones or crosstalk-canceled speakers, based on such processed audio files, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks can be used with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the description of the present invention. But an ordinary-skilled artisan would understand that the present invention may be practiced without these specific details. Computer systems, servers, workstations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

The examples and embodiments described herein are for illustrative purposes only and various modifications or changes in light thereof will be apparent to persons skilled in the art and are included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

CIPIC HRTF Database (https://www.ece.ucdavis.edu/cipic/spatial-sound/hrtf-data/), IRCAM Listen HRTF Database (http://recherche.ircam.fr/equipes/salles/listen/)

The invention claimed is:

1. A method for head related transfer function (HRTF) individualization, comprising:

obtaining a set of N HRTF filters in the frequency or time domain, wherein the N HRTF filters of the set of N HRTF filters are measured, calculated, or synthesized HRTF filters;

converting each HRTF filter of the set of N HRTF filters to a minimum-phase form to produce a set of N minimum-phase HRTF filters in the time domain;

interpolating between two minimum-phase HRTF filters of the set of N minimum-phase HRTF filters in the time domain to produce an interpolated HRTF filter;

introducing L interaural time differences (ITDs) for L locations of sound sources to be virtualized, wherein L is an integer greater than or equal to 1; and adding the L ITDs back into the N minimum-phase HRTF filters of the set of N minimum-phase HRTF filters to produce a set of N reconstructed HRTF filters.

2. The method according to claim 1, wherein the HRTF filters of the set of N HRTF filters are measured HRTF filters.

3. The method according to claim 2, wherein each measured HRTF filter of the set of N measured HRTF filters is valid.

4. The method according to claim 1, wherein converting each HRTF filter of the set of HRTF filters to a minimum-phase form is accomplished via computation of a cepstrum (spectrum) of the HRTF filter in the frequency domain and replacing anticausal components of the cepstrum with casual components.

5. The method according to claim 4, wherein replacing anti causal components of the cepstrum with causal components reflects non-minimum phase zeros inside a unit circle preserving spectral magnitude.

6. The method according to claim 1, wherein prior to interpolating, ordering the N minimum-phase HRTF filters of the set of N minimum-phase HRTF filters to create an ordered set of N minimum-phase HRTF filters, wherein interpolating comprises interpolating between two adjacent minimum-phase HRTF filters of the ordered set of N minimum-phase HRTF filters, wherein the two minimum-phase HRTF filters interpolated between are minimum-phase HRTF filter 1 and minimum-phase HRTF filter 2, of the N minimum-phase HRFT filters 1, 2, . . . , N−1, N.

7. The method according to claim 6, where N is greater than 2, further comprising:

interpolating between minimum-phase filters 2 and 3, . . . , N−1 and N to produce N−2 additional interpolated HRTF filters, so as to produce a set of N−1 interpolated HRTF filters.

8. The method according to claim 7, further comprising:

interpolating between minimum-phase filters N and 1 to produce a further additional interpolated HRTF filter, so as to produce a set of N interpolated HRTF filters.

9. The method according to claim 1, further comprising:

repeating the steps of obtaining, converting, interpolating, introducing, and adding with respect to at least one additional set of N HRTF filters in the frequency or time domain to produce at least one additional set of N reconstructed HRTF filters.

10. The method according to claim 9, further comprising:

processing an audio signal with the set of N reconstructed HRTF filters and the at least one additional set of N reconstructed HRTF filters to produce a processed audio signal and at least one additional processed audio signal; and presenting a user with the processed audio signal and the at least one additional processed audio signal allowing the user to select an ideal set of N reconstructed HRTF filters.

11. A device for head related transfer function (HRTF) individualization, comprising:

a processor, wherein the processor is configured to:

obtain a set of N HRTF filters in the frequency or time domain, wherein the N HRTF filters of the set of N HRTF filters are measured, calculated, or synthesized HRTF filters;

convert each HRTF filter of the set of N HRTF filters to a minimum-phase form to produce a set of N minimum-phase HRTF filters in the time domain;

interpole between two minimum-phase HRTF filters of the set of N minimum-phase HRTF filters in the time domain to produce an interpolated HRTF filter;

introduce L interaural time differences (ITDs) for L locations of sound sources to be virtualized, wherein L is an integer greater than or equal to 1; and add the L ITDs back into the N minimum-phase HRTF filters of the set of N minimum-phase HRTF filters to produce a set of N reconstructed HRTF filters.

12. The device according to claim 11, wherein the HRTF filters of the set of N HRTF filters are measured HRTF filters.

13. The device according to claim 12, wherein each measured HRTF filter of the set of N measured HRTF filters is valid.

14. The device according to claim 11, wherein converting each HRTF filter of the set of HRTF filters to a minimum-phase form is accomplished via computation of a cepstrum (spectrum) of the HRTF filter in the frequency domain and replacing anticausal components of the cepstrum with casual components.

15. The device according to claim 14, wherein replacing anti causal components of the cepstrum with causal components reflects non-minimum phase zeros inside a unit circle preserving spectral magnitude.

16. The device according to claim 11, wherein prior to interpolating, ordering the N minimum-phase HRTF filters of the set of N minimum-phase HRTF filters to create an ordered set of N minimum-phase HRTF filters, wherein interpolating comprises interpolating between two adjacent minimum-phase HRTF filters of the ordered set of N minimum-phase HRTF filters, wherein the two minimum-phase HRTF filters interpolated between are minimum-phase HRTF filter 1 and minimum-phase HRTF filter 2, of the N minimum-phase HRFT filters 1, 2, . . . , N−1, N.

17. The device according to claim 16, where N is greater than 2, the processor is configured to:

interpolate between minimum-phase filters 2 and 3, . . . , N−1 and N to produce N−2 additional interpolated HRTF filters, so as to produce a set of N−1 interpolated HRTF filters.

18. The device according to claim 17, wherein the processor is configured to:

interpolate between minimum-phase filters N and 1 to produce a further additional interpolated HRTF filter, so as to produce a set of N interpolated HRTF filters.

19. The device according to claim 11, wherein the processor is configured to:

repeat obtaining, converting, interpolating, introducing, and adding with respect to at least one additional set of N HRTF filters in the frequency or time domain to produce at least one additional set of N reconstructed HRTF filters;

process an audio signal with the set of N reconstructed HRTF filters and the at least one additional set of N reconstructed HRTF filters to produce a processed audio signal and a processed audio signal and the at least one additional processed audio signal; and present a user with the processed audio signal and the at least one additional processed audio signal allowing the user to select an ideal set of N reconstructed HRTF filters.

20. One or more non-transitory computer-readable media having computer-readable instructions embodied thereon for performing a method for head related transfer function (HRTF) individualization, comprising:

providing a processor, wherein the processor is configured to perform the method of:

obtaining a set of N HRTF filters in the frequency or time domain, wherein the N HRTF filters of the set of N HRTF filters are measured, calculated, or synthesized HRTF filters;

converting each HRTF filter of the set of N HRTF filters to a minimum-phase form to produce a set of N minimum-phase HRTF filters in the time domain;

interpolating between two minimum-phase HRTF filters of the set of N minimum-phase HRTF filters in the time domain to produce an interpolated HRTF filter;

introducing L interaural time differences (ITDs) for L locations of sound sources to be virtualized, wherein L is an integer greater than or equal to 1; and adding the L ITDs back into the N minimum-phase HRTF filters of the set of N minimum-phase HRTF filters to produce a set of N reconstructed HRTF filters.

* * * * *